United States Patent
Saito et al.

[11] 3,944,335
[45] Mar. 16, 1976

[54] ACOUSTO-OPTIC FILTER

[75] Inventors: Koetsu Saito; Tsutomu Yano; Akinori Watanabe, all of Kawasaki, Japan

[73] Assignee: Matsushita Electric Industrial Company, Ltd., Osaka, Japan

[22] Filed: Aug. 27, 1974

[21] Appl. No.: 500,886

[30] Foreign Application Priority Data
Dec. 14, 1973   Japan............................ 48-140616

[52] U.S. Cl.................................. 350/161; 350/149
[51] Int. Cl.²................................. G02F 1/34
[58] Field of Search.................. 350/161, 149

[56] References Cited
UNITED STATES PATENTS
3,419,322   12/1968   Adler.................................. 350/161

OTHER PUBLICATIONS
"Acoustic Wave Propagation in TeO₂ Single Crystal," by Ohmachi et al., JOASA, Vol. 51, No. 1, pp. 164–168, 1972.
"Acousto–Optic Light Deflectors Using Optical Activity in Paratellorite" by Warner et al., J. Appl. Physics, Vol. 43, No. 11, Nov. 1972, pp. 4489–4495.

*Primary Examiner*—Vincent P. McGraw
*Attorney, Agent, or Firm*—Stevens, Davis, Miller & Mosher

[57] ABSTRACT

An acousto-optic filter utilizing the far-off-axis anisotropic Bragg diffraction comprising an optically anisotropic acousto-optic medium embodied by a paratellurite crystal. An ultrasonic wave generated by a transducer is propagated in a direction different from that of the wave front normal to make the light-sound interaction length in the medium elongate by slanting the bonding surface of the transducer to the crystal medium.

5 Claims, 6 Drawing Figures

ACOUSTO-OPTIC FILTER

This invention relates to an acousto-optic filter for selecting light utilizing an optically anisotropic crystal and more particularly to the structure of a novel acousto-optic filter utilizing the far-off-axis anisotropic Bragg diffraction effectively.

An object of this invention is to provide an acousto-optic filter of the far-off-axis anisotropic Bragg diffraction type arranged in such a manner that the interaction length of light and an ultrasonic wave is effective over the whole length of the crystal.

One feature of this invention lies in that the normal direction of the ultrasonic wave front propagating in the crystal is arranged to be different from the propagation direction of the ultrasonic wave so as to increase the effective interaction length.

This invention can be applied to optically anisotropic crystals capable of utilizing the far-off-axis anisotropic Bragg diffraction, for example; quartz, calcium molybdate and paratellurite. It is particularly effective when applied to paratellurite.

The above and other objects, features and advantages of this invention will be better understood from the following detailed description when taken in conjunction with the accompanying drawings in which, FIG. 1 is a diagram for illustrating the faroff-axis anisotropic Bragg diffraction;

For easy understanding, the background of this invention will be described prior to the description of the preferred embodiments of this invention.

When an light and an ultrasonic waves are caused to interact in an optically anisotropic material, for an ultrasonic wave of a particular frequency, light of a particular wavelength may be interacted and diffracted. Devices for selecting light of a particular wavelength from an incident light beam by utilizing this phenomenon are called acoustooptic filters.

Acousto-optic filters may be classified into two broad classes, one called the collinear type and the other called the non-collinear type. The collinear type represents acousto-optic filters in which light an ultrasonic waves are propagated along the same line to cause interaction therebetween in an optically anisotropic medium, and the non-collinear type represents those in which the light and ultrasonic waves do not propagate along the same line. The non-collinear type includes the far-off-axis anisotropic Bragg diffraction type and the isotropic Bragg diffraction type. In filters of both of these types, the angle made between the propagation directions of the light and ultrasonic waves is shifted from a right angle. This invention is concerned particularly with acousto-optical filters utilizing far-off-axis anisotropic Bragg diffraction. The far-off-axis anisotropic Bragg diffraction will be described using as an example the paratellurite crystal in which this effect is especially remarkable.

Figure 1:
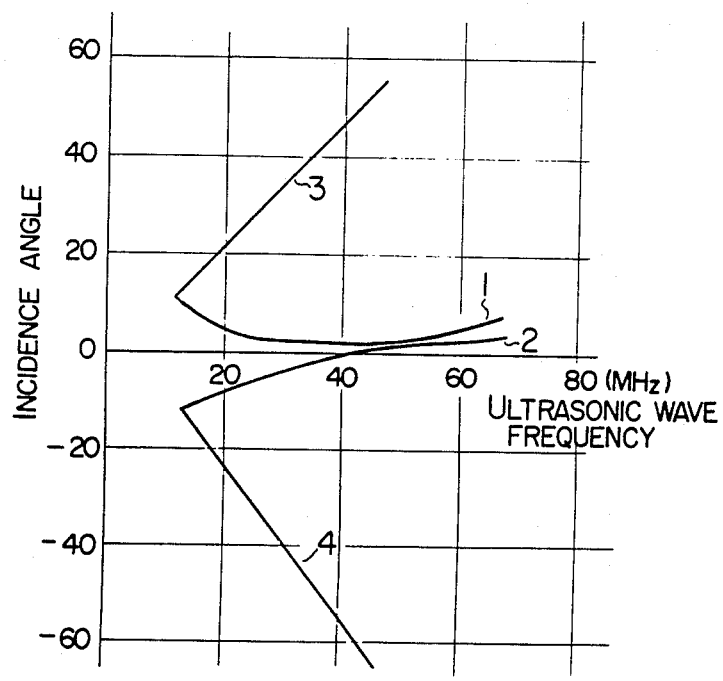

When light and ultrasonic waves interact in a crystal in which two phase velocities of light exist in a propagation direction, diffraction of light occurs. The phase of the diffracted light may be varied by 180° from that of the incident light and the polarization state may change. This is the so-called anisotropic Bragg diffraction. This diffraction occurs where the incident light makes a small angle with the ultrasonic wave front and also where it makes a large angle. The diffraction phenomenon at a large incident angle of light is called the far-off-axis anisotropic Bragg diffraction, while the diffraction at a smaller incident angle is called the nearby-axis anisotropic Bragg diffraction. The relation of the incident angle and the ultrasonic wave frequency in a $TeO_2$ crystal is shown in FIG. 1, in which the far-off-axis anisotropic Bragg diffraction arises above a certain frequency and the diffracted angle increases abruptly as shown by curves 3 and 4. The near-by-axis anisotropic Bragg diffraction indicated by curves 1 and 2 has been frequently utilized in light deflectors and modulators.

Figure 2:
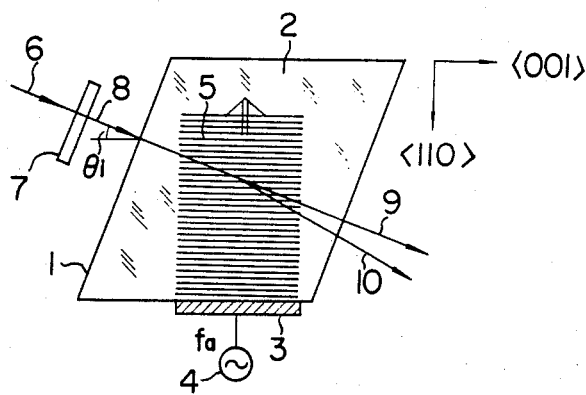
FIGS. 2 and 3 are schematic diagrams of acoustooptic filters utilizing the far-off-axis anisotropic Bragg diffraction.

An acousto-optic filter utilizing the far-off-axis anisotropic Bragg diffraction will be described with reference to FIG. 2, in which an acousto-optic filter 1 comprises an acousto-optic crystal 2 (referred to simply as a crystal, hereinbelow) and a piezoelectric transducer 3 (referred to simply as a transducer, hereinbelow). An electric signal 4 is converted into an ultrasonic wave in the transducer 3 and becomes a transverse ultrasonic wave 5 propagating along the crystal 2 in the direction shown by the arrow. A light beam 6 becomes linearly polarized light 8 after passing through a polarizer 7 and is incident on the crystal 2 with an angle $\theta_i$ made with the <001> axis of the crystal 2. Such a light beam causes interaction with the transverse ultrasonic wave 5 to generate a diffracted light beam 10 as well as a non-diffracted light beam 9. The diffracted beam 10 emerges from the crystal 2 as linearly polarized light having a polarization plane rotated by 90° from that of the incident light 8. Here, the following relation holds among the incident angle $\theta_i$, the ultrasonic wave frequency $f_a$ and optical wavelength $\lambda$ causing the diffraction phenomenon, $$\sin \theta_i = \frac{\lambda}{\Delta n \cdot v_a} \cdot f_a$$

where $\Delta n$ is the birefringence and $v_a$ the acoustic velocity of the transverse ultrasonic wave. Referring to this relation, if $\theta_i$ is fixed and $f_a$ is varied, the wavelength $\lambda$ of the diffracted light 10 varies accordingly. Thus, light of a particular wavelength can be selected from the incident light beam 6 and hence an acousto-optic filter is formed.

When a far-off-axis anisotropic Bragg diffraction type acousto-optic filter is formed of paratellurite $TeO_2$ having a large acousto-optic figure of merit, the input power can be reduced to the order of one five hundredth compared with the conventional acousto-optic filters for obtaining the same diffracted light intensity. Thus, the crystal and the driving circuit can be made smaller and further heat generation in the device is small. Further the spectral bandwidth of the transmitted light can be arbitrarily varied from several Angstroms to the order of 1000 A by changing the incident angle. In a rectangular transducer utilizing the light diffraction phenomena in paratellurite, 100 % diffraction of the incident light can be achieved at an ultrasonic input power of about 170 mW/cm at an optical wavelength of 6338A. Generally, denoting the height and the length of a transducer by $h$ and $L$, the ultrasonic input required for 100 % diffraction is expressed by $170 \cdot h/L$ mW.

Figure 3:
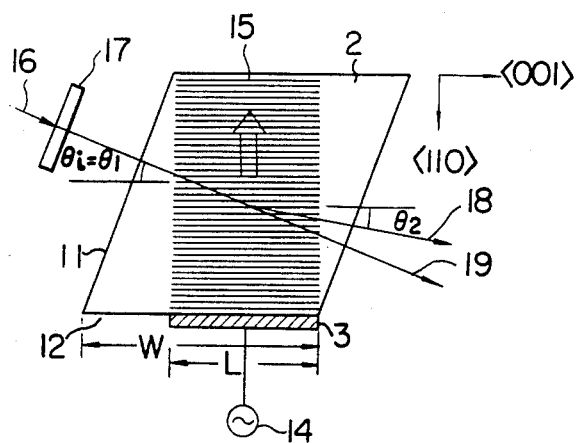

In an acousto-optic filter utilizing the anisotropic Bragg diffraction, however, an incident surface 11 is slanted from the (001) surface of a crystal 2 as shown in FIG. 3 for achieving the normal incidence of light. On the other hand, the maximum length $L_{max}$ of a transducer 3 adhered to a (110) surface 12 of the crystal is limited to be $L_{max} \leq W \cos^2 \theta_i - R \tan \theta_i$ for eliminating the reflection of the ultrasonic wave at the optical incident surface 11 (if reflection exists, light of different wavelength is unfavorably diffracted) where $W$ is the length of the crystal in the <001> direction and $R$ is the beam diameter of the incident light. Thus, as is shown in FIG. 3, the effective interaction length of light and an ultrasonic wave becomes shorter than the real crystal length $W$. This implies that the ultrasonic input required for 100 % diffraction increases. Further, since the spectral bandwidth of the transmitted light is reciprocally proportional to the length of the transducer, a large crystal is required to obtain light of narrow bandwidth and stable operation and hence the unnecessary portion becomes large.

Therefore, this invention has been made to improve the above-mentioned acousto-optic filter.

Figure 4:
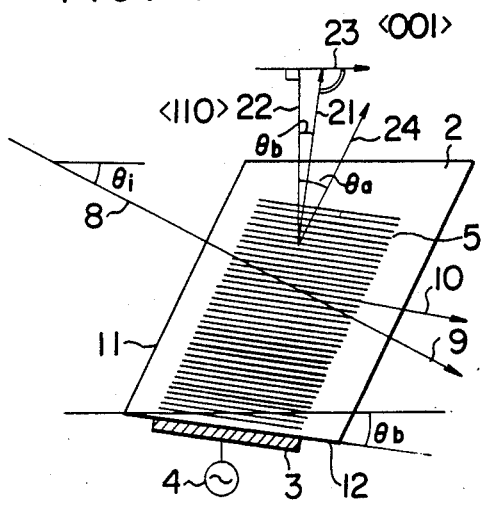
FIG. 4 is a schematic cross-section of an enhanced interaction embodiment of an acousto-optic filter according to this invention.

The principles of the invention will now be described in connection with an embodiment of FIG. 4. In this embodiment, the description will be based on the use of paratellurite as the crystal. This is because paratellurite is known to exhibit a phenomenon which shows the remarkable effect of this invention (Journal of Acoustical Society of America, Vol. 51, No. 1, pages 164 to 168). It is known, as is shown in FIG. 4, that in a paratellurite crystal when the wave front normal of an ultrasonic wave 21 is slightly inclined from the <110> direction 22 of the crystal and becomes nonorthogonal to the <001> direction 23 as is shown in FIG. 4, the propagation direction 24 of the ultrasonic wave (i.e., the energy flow direction of the ultrasonic wave) becomes largely slanted from <110> direction. Utilizing this phenomenon as is shown in FIG. 4 in an acousto-optical filter of the far-off-axis anisotropic Bragg diffraction type, an ultrasonic wave can be propagated effectively over the whole crystal without allowing reflection at the optical incident surface 11 of the crystal 2 even when the length of the transducer 3 is elongated, and thus the effective interaction length of the incident light 8 and the ultrasonic wave 5 can be increased.

Figure 5:
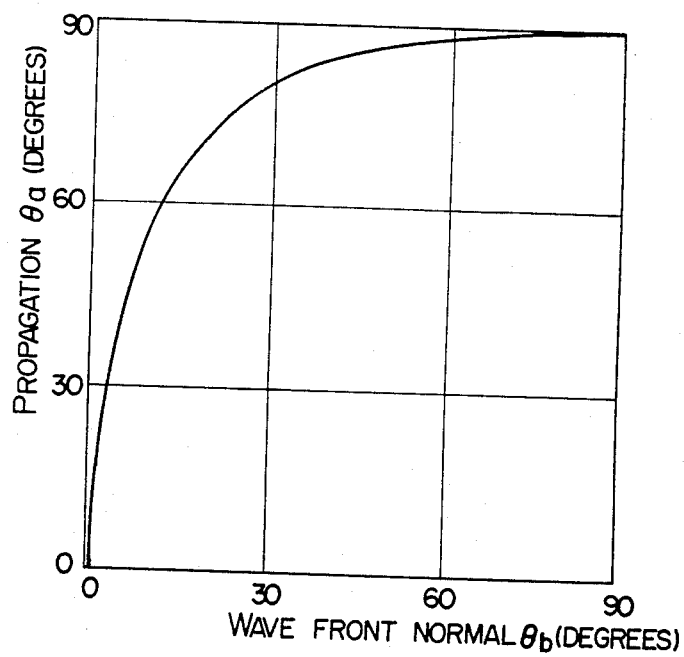
FIG. 5 is a diagram showing the relation of the angle made between the wave front normal and the crystal direction and the propagation direction of an ultrasonic wave.

Here, the incident surface 11 is a surface inclined from the <110> direction to the <001> direction by an angle of $\theta_i$. The surface 12 on which the transducer 12 is affixed is a surface slanted from the (110) surface to the <110> direction by an angle $\theta_b$. The wave front normal 21 of the ultrasonic wave generated from the transducer 3 is slanted from the <110> direction 22 by an angle of $\theta_b$. Thus, due to the anisotropy of the crystal the real propagation direction (energy flow direction) 24 in which an ultrasonic wave can really propagate becomes slanted by an angle of $\theta_a$ from the <110> direction. This relation between $\theta_b$ and $\theta_a$ is shown in FIG. 5. The values of $\theta_i$ and $\theta_a$ can be made equal by appropriately selecting $\theta_b$; i.e., the ultrasonic wave can be propagated along the incident surface.

For example, when the incident angle $\theta_i$ is set at 30°, the ultrasonic wave 5 can propagate with a slant equal to $\theta_i$ (= 30°) if $\theta_b$ is taken at 2.5°. Thus, light and ultrasonic waves can interact over the whole crystal region.

According to this embodiment, when the angle $\theta_i$ is set at 30°, the diameter of the light beam 5 mm and the length of the crystal 20 mm, the ultrasonic input can be reduced to about 72 % compared to the similar conventional case. Further, the spectral bandwidth becomes 0.72 times as narrow as the conventional case.

This invention cannot be applied to general collinear type acousto-optic filters. It can be applied to isotropic Bragg diffraction type acousto-optic filters (for example one reported by Chang of Isomet Co. Ltd. in Conference on Laser Engineering and Applications of IEEE/OSA in 1973), but since the angle is not large the effect is small.

In the above embodiment, the shape of the crystal is varied and the surface for affixing the transducer to the crystal is slanted by $\theta_b$ from the <001> direction to offset the orthogonal relation of the ultrasonic wave front normal and the <001> direction of the crystal.

Figure 6:
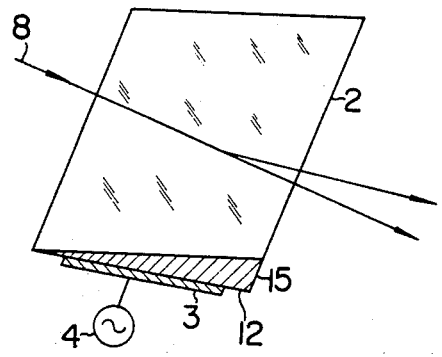
FIG. 6 is a cross-section of another enhanced interaction embodiment of an acousto-optic filter according to this invention.

In another embodiment shown in FIG. 6, the shape of the crystal can be kept as usual and an intermediate medium is used between the crystal 2 and a transducer 3 to make an angle between the transducer adhering surface 12 and the <001> direction to thereby change the propagating direction of the ultrasonic wave. Namely, a wedge-shaped intermediate medium 15 having an acoustic impedance equal to or close to that of the crystal 2 (for example, those formed of chalcogenide glass or another tellurium dioxide single crystal) is inserted between the crystal and the transducer 3 to set the ultrasonic wave front normal at an angle which is not perpendicular to the <001> direction of the crystal. Thus, the ultrasonic wave can propagate in a slanted direction and interaction can occur effectively over the whole crystal. The angle of the wedge $\alpha$ can be determined from $$\sin \alpha = v_m \cdot \sin \theta_b / v_{Te}$$

where $v_m$ and $v_{Te}$ are acoustic velocities in the intermediate wedge medium and in paratellurite respectively.

Further, according to this embodiment it is more convenient to use no particular intermediate medium and to provide an adhesive for adhering the transducer in a wedge shape.

As described above, according to this invention, the interaction length of the light and ultrasonic waves can be elongated, the ultrasonic input and hence the electrical input can be much reduced further and further the spectral bandwidth of the transmitted light can also be reduced. This invention is particularly effective for acousto-optic filters of the far-off-axis anisotropic Bragg diffraction type.

What is claimed is:

1. An acousto-optic filter comprising:
   an acousto-optic medium in which light has two different phase velocities in a propagating direction,
   transducer means for propagating an ultrasonic wave in said medium, and
   means for directing a light beam to said medium so as to cause far-off-axis anisotropic Bragg diffraction with said ultrasonic wave, said diffraction occurring at a relatively large indicent angle with respect to the plane of the wave front of said ultrasonic wave in said medium, the propagation direction of the diffracted light being displaced from the plane of the wave front of said ultrasonic wave in the same direction as that of undiffracted light to produce optical filtering, wherein the wave front normal and the energy flow direction of the ultrasonic wave propagating in the medium are different from each other.

2. An acousto-optic filter according to claim 1, wherein said acousto-optic medium is a paratellurite single crystal.

3. An acousto-optic filter according to claim 2, wherein said transducer means is adhered to a surface slanted from the (110) plane of the crystal medium.

4. An acousto-optic filter according to claim 2, wherein a wedge-shaped intermediate medium is inserted between the (110) surface of the crystal medium and the transducer means so as to form a slanted structure therewith.

5. An acousto-optic filter according to claim 4, wherein said intermediate medium has substantially the same acoustic impedance as that of said crystal.

* * * * *